United States Patent Office 3,078,645
Patented Feb. 26, 1963

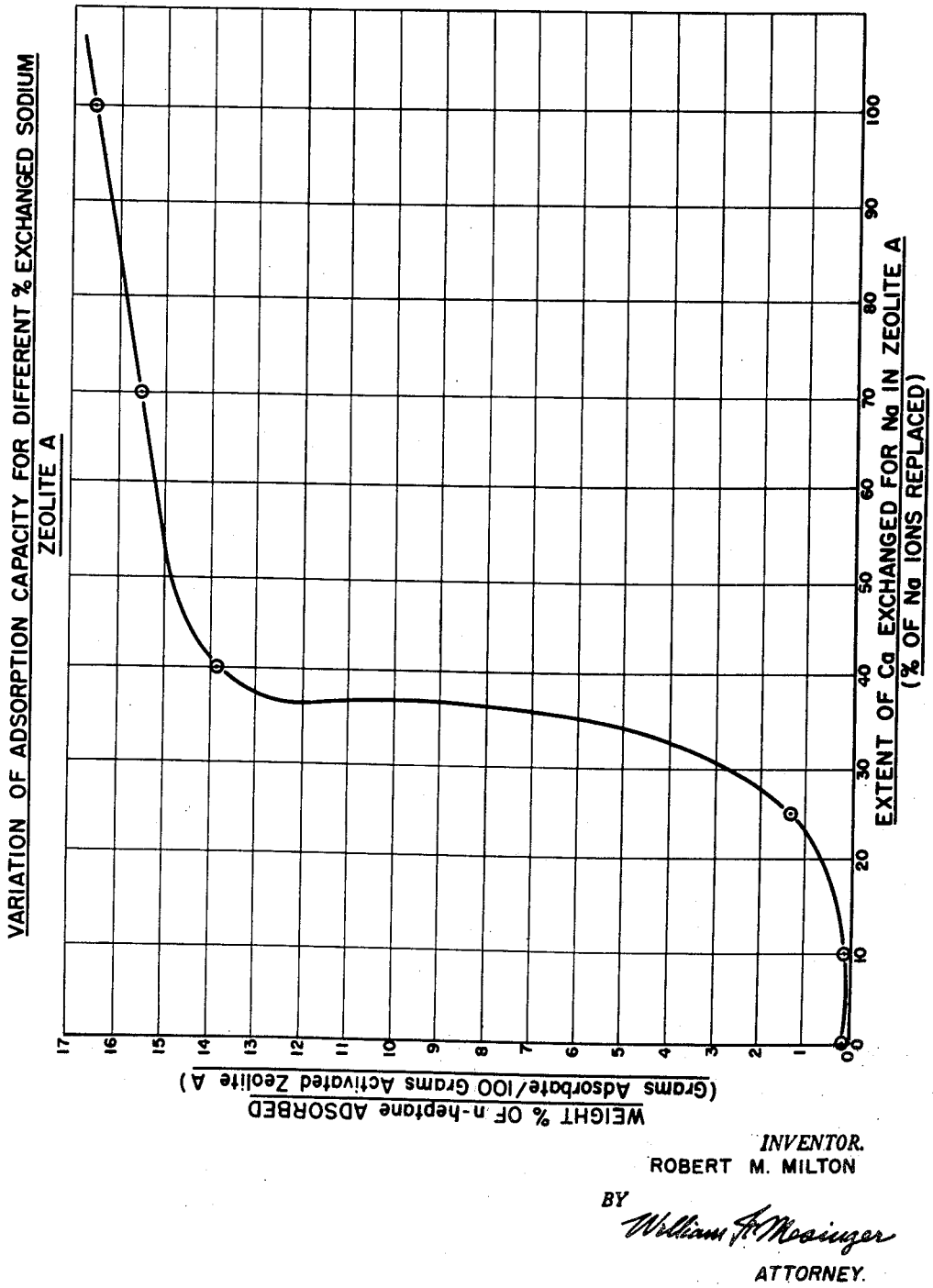

3,078,645
HYDROCARBON SEPARATION
Robert M. Milton, Buffalo, N.Y., assignor to Union
Carbide Corporation, a corporation of New York
Filed Aug. 29, 1962, Ser. No. 220,267
10 Claims. (Cl. 55—75)

This invention relates to a method for adsorbing fluids and separating a mixture of fluids into its component parts. More particularly, the invention relates to a method of adsorbing normal saturated aliphatic hydrocarbons with adsorbents of the molecular sieve type. Still more particularly, the invention relates to a method for adsorbing such fluids from a fluid mixture containing at least one member of the group consisting of branched chain aliphatic hydrocrabons, and cyclic hydrocarbons containing at least four carbon atoms per molecule. This separation is advantageous in, for example, removing straight chain hydrocarbons from a vapor mixture containing branch chain and cyclic hydrocarbons, so as to improve the octane rating and performance of such mixture as gasoline.

Broadly, the invention comprises mixing molecules, in a fluid state, of the materials to be adsorbed or separated with at least partially dehydrated crystalline synthetic metal-aluminum-silicates, which will be described more particularly below, and affecting the adsorption of the adsorbate by the silicate. The synthetic silicate used in the process of the invention is in some respects similar to naturally occurring zeolites. Accordingly, the term "zeolite" would appear to be appropriately applied to these materials. There are, however, significant differences between the synthetic and natural silicates. To distinguish the synthetic material used in the method of the invention from the natural zeolites and other similar synthetic silicates, the sodium-aluminum-silicate and its derivatives taught hereinafter to be useful in the process of the invention will be designated by the term "zeolite A." While the structure and preferred method of making zeolite A will be discussed in some detail in this application, additional information about the material and its preparation may be found in an application filed December 24, 1953, Serial No. 400,388, now U.S. Patent No. 2,882,243, having issued April 14, 1959 in the name of R. M. Milton.

It is the principal object of the present invention to provide a process for the selective adsorption of molecules from fluids. A further object of the invention is to provide a method whereby certain molecules may be adsorbed and separated by crystalline synthetic metal-aluminum-silicate from fluid mixtures of those molecules and other molecules.

The single FIGURE is a graph showing the amount of n-heptane adsorbed versus the percent of calcium exchanged for sodium in zeolite A.

Certain adsorbents, including zeolite A, which selectively adsorb molecules on the basis of the size and shape of the adsorbate molecule are referred to as molecular sieves. These molecular sieves have a sorption area available on the inside of a large number of uniformly sized pores of molecular dimensions. With such an arrangement molecules of a certain size and shape enter the pores and are adsorbed while larger or differently shaped molecules are excluded. Not all adsorbents behave in the manner of the molecular sieves. Such common adsorbents as charcoal and silica gel, for example, do not exhibit molecular sieve action.

Zeolite A consists basically of a three-dimensional framework of $SiO_4$ and $AlO_4$ tetrahedra. The tetrahedra are cross-linked by the sharing of oxygen atoms so that the ratio of oxygen atoms to the total of the aluminum and silicon atoms is equal to two or $O/(Al+Si)=2$. The electrovalence of the tetrahedra containing aluminum is balanced by the inclusion in the crystal of a cation, for example, an alkali or alkaline earth metal ion. This balance may be expressed by the formula $Al_2/(Ca, Sr, Ba, Na_2, K_2)=1$. One cation may be exchanged for another by ion exchange techniques which are described below. The spaces between the tetrahedra are occupied by water molecules prior to dehydration.

Zeolite A may be activated by heating to effect the loss of the water of hydration. The dehydration results in crystals interlaced with channels of molecular dimensions that offer very high surface areas for the adsorption of foreign molecules. These interstitial channels will not accept molecules that have a maximum dimension of the minimum projected cross-section in excess of about 5.5 A. Factors influencing occlusion by the activated zeolite A crystals are the size and polarizing power of the interstitial cation, the polarizability and polarity of the occluded molecules, the dimensions and shape of the sorbed molecule relative to those of the channels, the duration and severity of dehydration and desorption, and the presence of foreign molecules in the interstitial channels. It will be understood that the refusal characteristics of zeolite A are quite as important as the adsorptive or positive adsorption characteristics.

Although there are a number of cations that may be present in zeolite A it is preferred to formulate or synthesize the sodium form of the crystal since the reactants are readily available and water soluble. The sodium in the sodium form of zeolite A may be easily exchanged for other cations as will be shown below. Essentially the preferred process comprises heating a proper mixture in aqueous solution of the oxides, or of materials whose chemical compositions can be completely represented as mixtures of the oxides, $Na_2O$, $Al_2O_3$, $SiO_2$, and $H_2O$, suitably at a temperature of about 100° C. for periods of time ranging from 14 minutes to 90 hours or longer. The product which crystallizes from the hot-mixture is filtered off and washed with distilled water until the effluent wash water in equilibrium with the zeolite has a pH of from about 9 to 12. The material, after activation, is ready for use as a molecular sieve.

Zeolite A may be distinguished from other zeolites and silicates on the basis of its X-ray powder diffraction pattern. The X-ray patterns for several of the ion exchanged forms of zeolite A are described below. Other characteristics that are useful in identifying zeolite A are its composition and density.

The basic formula for all crystalline zeolites where "M" represents a metal and "$n$" its valence may be represented as follows:

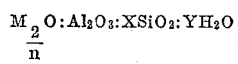

In general a particular crystalline zeolite will have values for X and Y that fall in a definite range. The value X for a particular zeolite will vary somewhat since the aluminum atoms and the silicon atoms both occupy essentially equivalent positions in the lattice. Minor variations in the relative numbers of these atoms do not significantly alter the crystal structure or physical properties of the zeolite. For zeolite A, numerous analyses have shown that an average value for X is about 1.85. The X value falls within the range $1.85 \pm 0.5$.

The value of Y likewise is not necessarily an invariant for all samples of zeolite A particularly among the various ion exchanged forms of zeolite A. This is true because various exchangeable ions are of different size, and, since there is no major change in the crystal lattice dimensions upon ion exchange, more or less space should be available in the pores of the zeolite A to accommodate water molecules. For instance, sodium zeolite A was partially exchanged with magnesium, and lithium, and the pore volume of these forms, in the activated condition, measured with the following results:

| Ion Exchanged Form of Zeolite A | Percent Na Ions Replaced | Value of Y |
|---|---|---|
| Na | 0 | 5.1 |
| Mg | 75 | 5.8 |
| K | 95 | 4 |
| Ca | 93 | 5 |

The average value for Y thus determined for the fully hydrated sodium zeolite A was 5.1; and in varying conditions of hydration, the value of Y can vary from 5.1 to essentially zero. The maximum value of Y has been found in 75% exchanged magnesium zeolite A, the fully hydrated form of which has a Y value of 5.8. In general an increase in the degree of ion exchange of the magnesium form of zeolite A results in an increase in the Y value. Larger values, up to 6, may be obtained with more fully ion exchanged materials.

In zeolite A synthesized according to the preferred procedure, the ratio $Na_2O/Al_2O_3$ should equal one. But if all of the excess alkali present in the mother liquid is not washed out of the precipitated product, analysis may show a ratio greater than one, and if the washing is carried too far, some sodium may be ion exchanged by hydrogen, and the ratio will drop below one. Thus, a typical analysis for a thoroughly washed sodium zeolite A is $0.99\ Na_2O : 1.0\ Al_2O_3 : 1.85\ SiO_2 : 5.1\ H_2O$. The ratio $Na_2O/Al_2O_3$ has varied as much as 23%. The composition for zeolite A lies in the range of $$\frac{M_{\frac{2}{n}}O}{Al_2O_3} = 1.0 \pm 0.2$$

where "M" represents a metal and "$n$" its valence.

Thus the formula for zeolite A may be written as follows:

$$1.0 \pm 0.2 M_{\frac{2}{n}}O : Al_2O_3 : 1.85 \pm 0.5 SiO_2 : YH_2O$$

In this formula "M" represents a metal, "$n$" its valence, and "Y" may be any value up to 6 depending on the identity of the metal and the degree of dehydration of the crystals.

The pores of zeolite A are normally filled with water and in this case, the above formula represents their chemical analysis. When other materials as well as water are in the pores of zeolite A, chemical analysis will show a lower value of Y and the presence of other adsorbates. The presence in the pores of non-volatile materials, such as sodium chloride and sodium hydroxide, which are not removable under normal conditions of activation at temperatures of from 100° C. to 650° C. does not significantly alter the crystal lattice or structure of zeolite A although it will of necessity alter the chemical composition.

The apparent density of fully hydrated samples of zeolite A were determined by the flotation of the crystals on liquids of appropriate densities. The technique and liquids used are discussed in an article entitled "Density of Liquid Mixture" appearing in Acta Crystallographica, 1951, vol. 4, page 565. The densities of several such crystals are as follows:

| Form of Zeolite | Percent of Exchange | Density, g./cc. |
|---|---|---|
| Sodium | 100 | 1.99±0.1 |
| Lithium | 65 | 1.92±0.1 |
| Potassium | 95 | 2.08±0.1 |
| Cesium | 31 | 2.26±0.1 |
| Magnesium | 75 | 2.04±0.1 |
| Calcium | 93 | 2.05±0.1 |
| Thallous | 80 | about 3.36 |

In making the sodium form of zeolite A, representative reactants are silica gel, silicic acid or sodium silicate as a source of silica. Alumina may be obtained from activated alumina, gamma alumina, alpha alumina, alumina trihydrate, or sodium aluminate. Sodium hydroxide may supply the sodium ion and in addition assist in controlling the pH. Preferably the reactants are water soluble. A solution of the reactants in the proper proportions is placed in a container, suitably of metal or glass. The container is closed to prevent loss of water and the reactants heated for the required time. A convenient and preferred procedure for preparing the reactant mixture is to make an aqueous solution containing the sodium aluminate and hydroxide and add this, preferably with agitation, to an aqueous solution of sodium silicate. The system is stirred until homogeneous or until any gel which forms is broken into a nearly homogeneous mix. After this mixing, agitation may be stopped as it is unnecessary to agitate the reacting mass during the formation and crystallization of the zeolite, however, mixing during formation and crystallization has not been found to be detrimental. The initial mixing of ingredients is conveniently done at room temperature but this is not essential.

In the synthesis of zeolite A, it has been found that the composition of the reacting mixture is critical. The crystallizing temperature and the length of time the crystallizing temperature is maintained are important variables in determining the yield of crystalline material. Under some conditions, for example too low a temperature for too short a time, no crystalline materials are produced. Extreme conditions may also result in the production of materials other than zeolite A.

The sodium form of zeolite A has been produced at 100° C., essentially free from contaminating materials, from reacting mixtures whose compositions, expressed as mixtures of the oxides, fall within either of the following ranges.

| | Range 1 | Range 2 |
|---|---|---|
| $SiO_2/Al_2O_3$ | 0.5–1.3 | 1.3–2.5 |
| $Na_2O/SiO_2$ | 1.0–3.0 | 0.8–3.0 |
| $H_2O/Na_2O$ | 35–200 | 35–200 |

When zeolite A has been prepared, mixed with other materials, the X-ray pattern of the mixture can be reproduced by a simple proportional addition of the X-ray patterns of the individual pure components.

Other properties, for instance molecular sieve selectivity, characteristic of zeolite A are present in the properties of the mixture to the extent that zeolite A is part of the mixture.

The adsorbents contemplated herein include crystalline materials obtained from the sodium form of zeolite A by partial or complete replacement of the sodium ion with certain divalent metal cations, namely magnesium, calcium, and strontium.

The spatial arrangement of the aluminum, silicon, and oxygen atoms which make up the basic crystal lattice of the zeolite remains essentially unchanged by partial or complete substitution of the sodium ion by other cations. The X-ray patterns of the ion exchanged forms of the zeolite A show the same principal lines at essentially the same positions, but there are some differences in the relative intensities of the X-ray lines, due to the ion exchange.

Ion exchange of the sodium form of zeolite A (which for convenience may be represented as $Na_2A$) or other forms of zeolite A may be accomplished by conventional ion exchange methods. A preferred continuous method is to pack zeolite A into a series of vertical columns with suitable supports at the bottom; successively pass through the beds a water solution of a soluble salt of the cation to be introduced into the zeolite; and change the flow from the first bed to the second bed as the zeolite in the first bed becomes ion exchanged to desired extent.

For magnesium, calcium, or strontium exchange, water solutions of the chlorides of these elements are effective as exchanging solutions. While it is more convenient to use water soluble compounds of the exchange cations, other solutions containing the desired cations or hydrated cations may be used.

Among the ways of identifying zeolite A and distinguishing it from other zeolites and other crystalline substances, the X-ray powder diffraction pattern has been found to be a useful tool. In obtaining the X-ray diffraction powder patterns, standard techniques were employed. The radiation was the $I\alpha$ doublet of copper, and a Geiger counter spectrometer with a strip chart pen recorder was used. The peak heights, I, and the positions as a function of $2\theta$, where $\theta$ is the Bragg angle, were read from the spectrometer chart. From these, the relative intensities, $100I/I°$, where $I°$ is the intensity of the strongest line or peak, and $d(obs)$, the interplanar spacing in A, corresponding to the recorded lines were calculated.

X-ray powder diffraction data for a sodium zeolite A ($Na_2A$), a 93% exchanged calcium zeolite A (CaA), and a 93% exchanged strontium zeolite A (SrA), are given in Table A. The table lists the $100I/I°$ and the $d$ values in A. for the observed line for the different forms of zeolite A. The X-ray patterns indicate a cubic unit cell of $a°$ of between 12.0 and 12.4 A. In a separate column are listed the sum of the squares of the Miller indices $(h^2+k^2+l^2)$ for a cubic unit cell that corresponds to the observed lines in the X-ray diffraction patterns. The $a°$ values for each particular zeolite are also tabulated and in another column the estimated errors in reading the position of an X-ray peak on the spectrometer chart appear.

The relative intensities and the positions of the lines are only slightly different for these various ion exchanged forms of zeolite A. The patterns show substantially all of the same lines, and all meet the requirements of a cubic unit cell of approximately the same size. The spatial arrangements of silicon-oxygen- and aluminum atoms, i.e. the arrangement of the $AlO_4$ and $SiO_4$ tetrahedra, are essentially identical in all the forms of zeolite A. The appearance of a few minor lines and the disappearance of others from one form of zeolite A to another as well as slight changes in the intensities and positions of some of the X-ray lines can be attributed to the different sizes and numbers of cations present in the various forms since these differences effect some small expansion or contraction of the crystals.

TABLE A

| $(h^2+k^2+l^2)$ | $Na_2A$ | | Estimated Error in $d$ value |
|---|---|---|---|
| | $d$ | $100I/I°$ | |
| 1 | 12.29 | 100 | ±0.02 |
| 2 | 8.71 | 69 | ±0.02 |
| 3 | 7.11 | 35 | ±0.01 |
| 4 | | | ±0.01 |
| 5 | 5.51 | 25 | ±0.01 |
| 6 | 5.03 | 2 | ±0.01 |
| 8 | 4.36 | 6 | ±0.01 |
| 9 | 4.107 | 36 | ±0.004 |
| 10 | | | ±0.003 |
| 11 | 3.714 | 53 | ±0.003 |
| 12 | | | ±0.003 |
| 13 | 3.417 | 16 | ±0.003 |
| 14 | 3.293 | 47 | ±0.003 |
| 16 | | | ±0.002 |
| 17 | 2.987 | 55 | ±0.002 |
| 18 | 2.904 | 9 | ±0.002 |
| 20 | 2.754 | 12 | ±0.002 |
| 21 | 2.688 | 4 | ±0.002 |
| 22 | 2.626 | 22 | ±0.002 |
| 24 | 2.515 | 5 | ±0.002 |
| 25 | 2.464 | 4 | ±0.002 |
| 26 | | | ±0.002 |
| 27 | 2.371 | 3 | ±0.002 |
| 29 | 2.289 | 1 | ±0.002 |
| 30 | 2.249 | 3 | ±0.002 |
| 32 | 2.177 | 7 | ±0.002 |
| 33 | 2.144 | 10 | ±0.001 |
| 34 | 2.113 | 3 | ±0.001 |
| 35 | 2.083 | 4 | ±0.001 |
| 36 | 2.053 | 9 | ±0.001 |

TABLE A (Cont'd)

| $(h^2+k^2+l^2)$ | $Na_2A$ | | Estimated Error in $d$ value |
|---|---|---|---|
| | $d$ | $100I/I°$ | |
| 37 | | | ±0.001 |
| 38 | | | ±0.001 |
| 41 | 1.924 | 7 | ±0.001 |
| 42 | 1.901 | 4 | ±0.001 |
| 44 | 1.858 | 2 | ±0.001 |
| 45 | 1.837 | 3 | ±0.001 |
| 49 | 1.759 | 2 | ±0.001 |
| 50 | 1.743 | 13 | ±0.001 |
| 51 | | | ±0.001 |
| 53 | 1.692 | 6 | ±0.001 |
| 54 | 1.676 | 2 | ±0.001 |
| 57 | 1.632 | 4 | ±0.001 |
| 59 | 1.604 | 6 | ±0.001 |
| 61 | 1.577 | 4 | ±0.001 |
| 62 | | | ±0.001 |
| 65 | 1.528 | 2 | ±0.001 |
| 66 | 1.516 | 1 | ±0.001 |
| 67 | | | ±0.001 |
| 68 | | | ±0.001 |
| 69 | 1.483 | 3 | ±0.001 |
| 70 | 1.473 | 2 | ±0.001 |
| 72 | | | ±0.001 |
| 74 | 1.432 | 3 | ±0.001 |
| 75 | 1.422 | 2 | ±0.001 |
| 77 | 1.404 | 5 | ±0.001 |
| 81 | 1.369 | 2 | ±0.001 |
| 82 | 1.360 | 8 | ±0.001 |
| $a°$ | 12.32 ±0.02 | | |

| $(h^2+k^2+l^2)$ | CaA | | SrA | | Estimated Error in $d$ value |
|---|---|---|---|---|---|
| | $d$ | $100I/I°$ | $d$ | $100I/I°$ | |
| 1 | 12.24 | 100 | 12.36 | 90 | ±0.02 |
| 2 | 8.66 | 39 | 8.72 | 66 | ±0.02 |
| 3 | 7.08 | 32 | | | ±0.01 |
| 4 | 6.12 | 12 | | | ±0.01 |
| 5 | 5.48 | 20 | | | ±0.01 |
| 6 | 5.00 | 4 | | | ±0.01 |
| 8 | | | | | ±0.01 |
| 9 | 4.08 | 35 | | | ±0.004 |
| 10 | 3.875 | 2 | | | ±0.003 |
| 11 | 3.096 | 34 | 3.714 | 60 | ±0.003 |
| 12 | 3.539 | 4 | 3.556 | 15 | ±0.003 |
| 13 | 3.398 | 18 | 3.415 | 21 | ±0.003 |
| 14 | 3.276 | 38 | 3.292 | 68 | ±0.002 |
| 16 | | | | | ±0.002 |
| 17 | 2.972 | 32 | 2.986 | 100 | ±0.002 |
| 18 | 2.888 | 9 | 2.903 | 38 | ±0.002 |
| 19 | | | | | ±0.002 |
| 20 | 2.741 | 7 | 2.753 | 49 | ±0.002 |
| 21 | 2.676 | 3 | | | ±0.002 |
| 22 | 2.614 | 24 | 2.625 | 49 | ±0.002 |
| 24 | 2.502 | 7 | | | ±0.002 |
| 25 | 2.451 | 7 | | | ±0.002 |
| 26 | | | | | ±0.002 |
| 27 | 2.359 | 3 | | | ±0.002 |
| 29 | | | | | ±0.002 |
| 30 | 2.238 | 3 | | | ±0.002 |
| 32 | 2.166 | 8 | | | ±0.002 |
| 33 | 2.141 | 8 | | | ±0.001 |
| 34 | 2.103 | 5 | | | ±0.001 |
| 35 | 2.074 | 2 | | | ±0.001 |
| 36 | 2.042 | 4 | | | ±0.001 |
| 40 | | | | | ±0.001 |
| 41 | 1.914 | 4 | | | ±0.001 |
| 42 | 1.891 | 3 | | | ±0.001 |
| 44 | | | | | ±0.001 |
| 45 | | | | | ±0.001 |
| 46 | | | | | ±0.001 |
| 48 | | | | | ±0.001 |
| 50 | 1.733 | 11 | | | ±0.001 |
| 52 | | | | | ±0.001 |
| 53 | 1.683 | 4 | | | ±0.001 |
| 54 | 1.667 | 2 | | | ±0.001 |
| 56 | | | | | ±0.001 |
| 57 | 1.623 | 2 | | | ±0.001 |
| 58 | 1.608 | 5 | | | ±0.002 |
| 61 | 1.569 | 4 | | | ±0.002 |
| 64 | | | | | ±0.002 |
| 68 | | | | | ±0.002 |
| 72 | 1.445 | 2 | | | ±0.002 |
| 74 | 1.425 | 2 | | | ±0.002 |
| 75 | 1.416 | 1 | | | ±0.002 |
| 76 | | | | | ±0.002 |
| 77 | 1.397 | 3 | | | ±0.002 |
| 82 | 1.353 | 5 | | | ±0.002 |
| 84 | | | | | ±0.002 |
| | 12.26 ±0.02 | | 12.32 ±0.02 | | |

In the above table, particularly with reference to SrA, certain values have not been listed since their calculation was not necessary in the determination of the dimensions of the unit cell. The dimension of the edge of the cubic unit cell of the magnesium zeolite A was obtained from data not tabulated above and is 12.29 A. ± 0.02 A.

The more significant $d$ values for zeolite A are given in Table B.

TABLE B

*d Value of Reflection in A*

| | |
|---|---|
| 12.2±0.2 | 3.38±0.06 |
| 8.6±0.2 | 3.26±0.05 |
| 7.85±0.15 | 2.96±0.05 |
| 4.07±0.08 | 2.73±0.05 |
| 3.68±0.07 | 2.60±0.05 |

Zeolite A may be defined as a synthetic crystalline metal aluminum-silicate having an X-ray powder diffraction pattern characterized by at least those reflections set forth in Table B.

Occasionally, additional lines not belonging to the pattern for zeolite A, appear in a pattern along with the X-ray lines characteristic of zeolite A. This is an indication that one or more additional crystalline materials are mixed with zeolite A in the sample being tested. Frequently these additional materials can be identified as initial reactants in the synthesis of the zeolite, or as other crystalline substances. When zeolite A is heat treated at temperatures of between 100 and 600° C. in the presence of water vapor or other gases or vapors, the relative intensities of the lines in the X-ray pattern may be appreciably changed from those existing in the unactivated zeolite A patterns. Small changes in line positions may also occur under these conditions. These changes in no way hinder the identification of these X-ray patterns as belonging to zeolite A.

The particular X-ray technique and/or apparatus employed, the humidity, the temperature, the orientation of the powder crystals and other variables, all of which are well known and understood to those skilled in the art of X-ray crystallography or diffraction can cause some variations in the intensities and positions of the lines. These changes, even in those few instances where they become large, pose no problem to the skilled X-ray crystallographer in establishing identities. Thus, the X-ray data given herein to identify the A lattice are not to exclude those materials which, due to some variable mentioned or otherwise known to those skilled in the art, fail to show all of the lines, or show a few extra ones that are permissible in the cubic system of the A zeolite, or show a slight shift in position of the lines, so as to give a slightly larger or smaller lattice parameter.

The zeolites contemplated herein exhibit adsorptive properties that are unique among known adsorbents. The common adsorbents, like charcoal and silica gel, show adsorption selectivities based primarily on the boiling point or critical temperature of the adsorbate. Activated zeolite A on the other hand exhibits a selectivity based on the size and shape of the adsorbate molecule. Among those adsorbate molecules whose size and shape are such as to permit adsorption by zeolite A, a very strong preference is exhibited toward those that are polar, polarizable, and unsaturated. Another property of zeolite A that contributes to its unique position among adsorbents is that of adsorbing large quantities of adsorbate either at very low pressures, at very low partial pressures, or at very low concentrations. One or a combination of one or more of these three adsorption characteristics or ethers can make zeolite A useful for numerous gas or liquid separation processes where adsorbents are not now employed. The use of zeolite A permits more efficient and more economical operation of numerous processes now employing other adsorbents.

Zeolite A may be activated by heating it in either air, a vacuum, or other appropriate gas to temperatures of as high as 600° C. The conditions used for desorption of an adsorbate from zeolite A vary with the adsorbate, but either raising the temperature and reducing the pressure, partial pressure or concentration of the adsorbate in contact with the adsorbent or a combination of these steps is usually employed. Another method is to displace the adsorbate by adsorption of another more strongly held adsorbate. The following Table C is a summary of adsorption data at a temperature of 25° C. (298° K).

TABLE C

| Ion Form Zeolite A | Hydrocarbon | | Weight Percent Adsorbed |
|---|---|---|---|
| | Type | mm. Hg | |
| Ca | $C_3H_8$ | 201 | 9.3 |
| Ca | $C_3H_8$ | 49 | 8.0 |
| Ca | $C_3H_8$ | 2 | 4.1 |
| Ca | $C_3H_8$ | 350 | 11.2 |
| Mg | $C_3H_8$ | 410 | 11.6 |
| Ca | $n\text{-}C_4H_{10}$ | 132 | 13.2 |
| Mg | $n\text{-}C_4H_{10}$ | 132 | 12.9 |
| Mg | $n\text{-}C_6H_{14}$ | 31 | 14.1 |
| Ca | $n\text{-}C_7H_{16}$ | 45 | 16.5 |
| Mg | $n\text{-}C_7H_{16}$ | 26 | 16.6 |
| Ca | $n\text{-}C_8H_{18}$ | 11 | 15.4 |
| Mg | $n\text{-}C_8H_{18}$ | 11 | 12.3 |

Among the monovalent metal cationic forms of zeolite A, the potassium compound has one of the smallest pore sizes and consequently will adsorb few molecules other than water. For example, potassium zeolite A excludes all saturated hydrocarbons and all branched chain, cyclic and aromatic hydrocarbons.

Other monovalent metal cationic forms of zeolite A such as the sodium and lithium compounds have slightly larger pore sizes and accordingly will adsorb a larger variety of molecules than potassium zeolite A. However, sodium and lithium zeolite A will not accept normal saturated aliphatic hydrocarbons having at least four carbon atoms per molecule, nor any branched chain and cyclic hydrocarbons.

Certain divalent cationic metal forms, namely calcium, strontium and magnesium exchanged zeolite A have molecular sieve adsorptive properties characteristic of materials with larger pores than exist in sodium zeolite A. These three forms of divalent ion exchanged zeolite A behave quite similarly and adsorb all molecules adsorbed by sodium zeolite A plus certain larger molecules. In general, strontium zeolite A has a sieving action similar to that of calcium and magnesium zeolite A, and in the ensuing description, the latter compounds are to be considered as representative of the group. Other divalent cationic forms such as barium, ion and copper exchanged zeolite A are not suitable in practicing the present invention for various reasons. As an illustraiton of this unsuitability, the crystal structure of the zeolite is destroyed by cationic exchange with the afore-mentioned elements.

At room temperature, long straight chain saturated hydrocarbon molecules are adsorbed by calcium and magnesium zeolite A but no appreciable amounts of branched chain molecules or cyclic molecules having four or more atoms in the ring are occluded. Typical data for magnesium and calcium exchanged zeolite A are given below in Table D.

TABLE D

| Adsorbate | Temp. (° C.) | Press. (mm. Hg) | Weight Percent Adsorbed on MgA | Press. (mm. Hg) | Weight Percent Adsorbed on CaA |
|---|---|---|---|---|---|
| n-propane | 25 | 410 | 11.6 | 350 | 11.2 |
| n-butane | 25 | 132 | 12.9 | 132 | 13.2 |
| n-hexane | 25 | 31 | 14.1 | | |
| n-heptane | 25 | 26 | 16.6 | 45 | 16.5 |
| n-octane | 25 | 11 | 12.3 | 11 | 15.4 |
| i-butane | 25 | 126 | 0.1 | 126 | 0.1 |
| i-pentane | 25 | 126 | 0.1 | 126 | 0.1 |
| benzene | 25 | | | 60 | 0.0 |
| m-xylene | 25 | | | 6 | 0.0 |

The calcium zeolite A for which data is given above is sodium zeolite A in which 50% of the sodium ions were replaced by calcium ion equivalents.

The divalent cationic compounds employed in the present invention such as the calcium and magnesium forms of zeolite A have a pore size that will permit adsorption of molecules for which the maximum dimension of the minimum projected cross-section is approximately 4.9 A. but not larger than about 5.5 A. The approximate maximum dimension in Angstrom units of the minimum projected cross-section for several molecules is as follows: benzene—5.5, propane—4.9, ethane—4.0, and isobutane—5.6. These were calculated from bond lengths, bond angles and van der Waals radii. The corresponding maximum dimensions for larger normal saturated hydrocarbons such as n-tetradecane are substantially the same as for propane, as the length of the molecule is not a determining factor. For example, long straight chain molecules such as n-tetradecane ($nC_{14}H_{30}$) have been separated from benzene by adsorption of the straight chain hydrocarbon with calcium zeolite A.

Thus calcium, strontium and magnesium zeolite A may be used for the separation of mixtures of straight chain and branched chain hydrocarbon molecules, or for separation of straight chain molecules from cyclic compounds having four or more atoms in the ring.

Calcium and magnesium exchanged zeolite A have not only larger pores, as evidenced by their sieving action, but the total pore volume available per gram of adsorbent to a small molecule is greater in calcium and magnesium zeolite A than it is in sodium or potassium zeolite A.

A unique characteristic of the present divalent cationic compounds such as calcium and magnesium exchanged zeolite A is that the opening of the pore to molecules larger than can be adsorbed by sodium zeolite A does not occur gradually as the sodium ions are replaced by calcium ions, but rapidly and in a narrow range of composition. When exchange is only 25% or less complete, the material has the sieving characteristics of sodium zeolite A, but when exchange 40% complete or more, the sieving characteristics are those described for calcium and magnesium zeolite A. For instance, the amount of n-heptane adsorbed on a sodium zeolite A sample which has been partially exchanged with calcium is tabulated below and shown in the single figure as a function of the completion of exchange.

| Extent of Ca Exchange for Na in zeolite A (Percent Na ions Replaced) | Weight Percent n-Heptane Adsorbed at 25° C., 45 mm. Hg |
| --- | --- |
| 0 | 0.1 |
| 10 | 0.1 |
| 25 | 1.3 |
| 40 | 13.8 |
| 70 | 15.5 |
| 100 | 16.5 |

A close inspection of this data will reveal that the adsorptive characteristic of zeolite A undergoes a remarkable change as the extent of calcium exchange is increased from about 25 to 40%. For example, the weight percent of n-heptane adsorbed at 40% exchange is at least 10.6 times that adsorbed with 25% calcium exchange. The same general relationship exists for exchange between other combinations of monovalent to divalent cationic metal exchange for zeolite A, as for example, lithium to magnesium, and potassium to strontium zeolite A.

The present invention combines these properties in such a manner that a novel process is provided for separating normal saturated aliphatic hydrocarbons from a vapor mixture containing at least one member of the group consisting of branched chain aliphatic hydrocarbons, and cyclic hydrocarbons containing at least four carbon atoms per molecule. It is to be understood that the phrase "cyclic hydrocarbons" as used herein includes the aromatics. In its broadest form, the process consists of contacting the vapor mixture with a bed of at least partially dehydrated crystalline zeolite A adsorbent material, in which at least 40% of the ion sites of the crystal are satisfied by a divalent metal cation. The normal saturated aliphatic hydrocarbon-depleted vapor mixture is then discharged from the crystalline zeolite A bed. It will be understood by those skilled in the art that at least two adsorbent beds may be provided, with one bed on adsorption stroke and the other bed on regeneration stroke. The respective flows are then periodically switched when the first bed becomes loaded with the adsorbate, so that the latter is placed on regeneration stroke and the second bed is placed on-stream.

Regeneration may be accomplished by well-known methods as for example heating the bed by direct or indirect heat transfer, employing a purge gas, or by drawing a vacuum on the bed during the regeneration stroke.

The many advantages of the invention are illustrated by the following examples.

*Example I*

A vapor mixture is provided containing 0.1 mole fraction n-pentane, 0.1 mole fraction n-hexane, 0.1 mole fraction n-heptane, the remainder being branched chain pentane, hexane, and heptane at a total pressure of 1000 mm. Hg. The mixture is contacted with a bed of calcium zeolite A, at a temperature of 272° C. (545° K.) for adsorption of at least 90% of each normal hydrocarbon fraction. Furthermore, the zeolite A bed is regenerated by purging with methane gas at the adsorption temperature and pressure.

*Example II*

A vapor mixture is provided containing 0.24 mole fraction of n-pentane and 0.21 mole fraction n-hexane, the remaining components being cyclic and branched chain $C_4$, $C_5$ and $C_6$ hydrocarbons at a total pressure of 75 p.s.i.a. and a temperature of 588° K. The mixture is contacted with a bed of calcium zeolite A, and the adsorbent is regenerated by reducing the pressure of the system to 0.8 p.s.i.a.

Although the preferred embodiments have been described in detail, it is contemplated that modifications of the process may be made and that some features may be employed without others, all within the spirit and scope of the invention as set forth herein.

This is a continuation-in-part application of copending application Serial No. 860,525 filed December 18, 1959 in the name of R. M. Milton, which in turn is a continuation-in-part of Serial No. 400,385, filed December 24, 1953 now abandoned.

What is claimed is:

1. A process for separating normal saturated aliphatic hydrocarbons from a vapor mixture containing the normal saturated hydrocarbons and at least one member of the group consisting of branched chain aliphatic hydrocarbons, and cyclic hydrocarbons containing at least four carbon atoms per molecule, which consists of contacting said vapor mixture with a bed of at least partially dehydrated crystalline zeolite A material in which at least 40% of the ion sites of the crystal are satisfied by a divalent cation comprising at least one member selected from the group consisting of calcium, magnesium and strontium, thereby adsorbing the normal saturated hydrocarbons; and thereafter discharging the normal saturated aliphatic hydrocarbon-depleted vapor mixture from said bed.

2. A process for separating normal saturated aliphatic hydrocarbons containing less than fifteen carbon atoms per molecule from a vapor mixture containing the normal saturated hydrocarbons and at least one member of the group consisting of branched chain aliphatic hydrocarbons, and cyclic hydrocarbons containing at least four carbon atoms per molecule, which consists of contacting said vapor mixture with a bed of at least partially dehydrated crystalline zeolite A material in which at least 40% of the ion sites of the crystal are satisfied by a divalent cation comprising at least one member selected from the group consisting of calcium, magnesium and strontium, thereby adsorbing the normal saturated hydrocarbons; and thereafter discharging the normal saturated aliphatic hydrocarbon-depleted vapor mixture from said bed.

3. A process according to claim 1 in which calcium zeolite A is the adsorbent material.

4. A process according to claim 1 in which magnesium zeolite A is the adsorbent material.

5. A process according to claim 1 in which said vapor mixture contains propane.

6. A process according to claim 1 in which said vapor mixture contains n-butane.

7. A process according to claim 1 in which said vapor mixture contains n-hexane.

8. A process according to claim 1 in which said vapor mixture contains n-heptane.

9. A process according to claim 1 in which said vapor mixture contains n-octane.

10. A process according to claim 1 in which said vapor mixture contains n-tetradecane.

References Cited in the file of this patent

UNITED STATES PATENTS

| | | |
|---|---|---|
| 1,813,174 | Lamb | July 7, 1931 |
| 2,306,610 | Barrer | Dec. 29, 1942 |
| 2,522,426 | Black | Sept. 12, 1950 |
| 2,818,137 | Richmond et al. | Dec. 31, 1957 |

OTHER REFERENCES

The Hydrothermal Chemistry of Silicates, Part I, by Barrer et al., Journal of The Chemical Society, 1951, pages 1267–1278.